Patented May 2, 1933

1,906,226

UNITED STATES PATENT OFFICE

EUGEN GLIETENBERG, WILHELM NEELMEIER, AND EUGEN RIMELE, OF LEVERKUSEN-ON-THE-RHINE, GERMANY, ASSIGNORS TO GENERAL ANILINE WORKS, INC., OF NEW YORK, N. Y., A CORPORATION OF DELAWARE

AZO DYESTUFFS INSOLUBLE IN WATER

No Drawing. Application filed January 4, 1929, Serial No. 330,422, and in Germany January 10, 1928.

The present invention relates to new water-insoluble dyestuffs and to the fiber dyed therewith, more particularly it relates to water insoluble azo dyestuffs, dyeing violet to blue shades, obtainable by coupling with a 2.3-hydroxy-naphthoic acid arylamide which is not substituted by a carboxylic acid-, sulfonic acid- or hydroxy group, a diazo compound of a 1.4-phenylenediamine, in which a hydrogen atom of the one amino group is replaced by the residue of an aromatic carboxylic acid, for example by the residue of benzoic acid and of homologues thereof, for instance of naphthoic acid, terephthalic acid and the like, which residues may be further substituted in the nuclei except by a carboxylic acid-, sulfonic acid- or hydroxy group.

Our new dyestuffs may be represented by the following general formula:

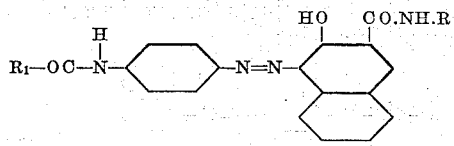

wherein R and $R_1$ stand for radicals of the benzene or naphthalene series, and wherein the nuclei may be further substituted except by a carboxylic acid-, sulfonic acid- or hydroxy group.

In their dry pulverized form, the new dyestuffs are generally bluish red to dark powders, they are insoluble in water, soluble in concentrated sulfuric acid and yield upon reduction with stannous chloride and hydrochloric acid the starting para-phenylenediamine and a 1-amino-2.3-hydroxynaphthoic acid arylide. The dyeings prepared on the fiber are distinguished by an excellent fastness to washing, chlorine and kier boiling.

In preparing the dyestuffs on the fiber, especially on cotton, the material to be dyed is impregnated with a grounding liquor, containing the 2.3-hydroxy-naphthoic arylide, centrifuged, wrung out, and the dyestuff is developed by treating the impregnated material for about one-half hour in a diazo bath. The dyed material is rinsed, soaped in a boiling soap bath, again rinsed and dried.

For dyeing 50 grams of cotton, the grounding liquor is prepared by dissolving together about ½ gram to about 5 grams of the 2.3-hydroxynaphthoic acid arylide, about 1 to about 10 ccm caustic soda lye of 34° Bé., and about 1 to about 10 ccm Turkey red oil of 50% strength, and making up the whole with water to 1 liter.

The developing bath is prepared by diazotizing about 1 gram to about 3 grams of the phenylene diamine with about 1 to about 3 ccm of hydrochloric acid of 22° Bé. and about 3 to about 9 ccm of a 10 per cent sodium nitrite solution, while cooling with ice. When the diazotization is complete, the liquid is neutralized with about 4 to about 20 ccm of a sodium acetate solution of 20 per cent strength, whereupon 10 grams of common salt are added, and the whole is made up with water to 1 liter.

The following examples serve to illustrate our invention, without limiting it thereto:

*Example 1.*—50 grams of cotton yarn are impregnated for one-half hour with a grounding solution, containing per liter 5 grams of the 5-chloro-2-toluidide of 2.3-hydroxy-naphthoic acid; the impregnated yarn is wrung out and introduced into a diazo bath, (neutralized in the customary manner), containing in one liter 3 grams of 1-amino-4-naphthoyl - amino - 2-methoxy - 5-methylbenzene. The dyed material is then rinsed and soaped in a boiling soap bath. A clear bluish violet dyeing of very satisfactory fastness properties is obtained.

The dyestuff corresponds to the following formula:

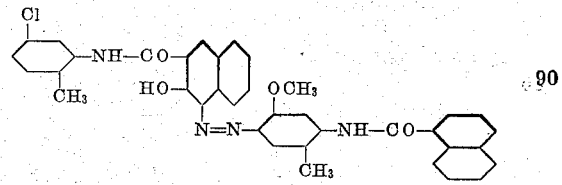

*Example 2.*—On proceeding as described in Example 1 but replacing the diazo component by the reduced condensation product of isophthalic acid dichloride with 2 molecules of 1-amino-4-nitro-2-methoxy-5-methylbenzene, violet shades of similar properties are obtained.

*Example 3.*—50 grams of cotton yarn are impregnated for one-half hour with a grounding liquor, containing 2 grams of 2.3-hydroxynaphthoic acid o-toluidide in a liter, the impregnated yarn is wrung out and developed in a diazo bath prepared in the known manner and containing 2.8 grams per liter of diazotized 1-amino-4-benzoylamino-2.5-di-ethoxybenzene. The dyed material is rinsed and soaped in a boiling soap bath. A clear blue shade is thus obtained, possessing good fastness to washing, chlorine and kier boiling.

The dyestuff corresponds to the following formula:

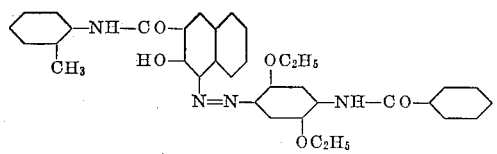

*Example 4.*—50 grams of cotton yarn are impregnated for one-half hour with a grounding solution, containing 2 grams of 2.3-hydroxynaphthoic acid anilide, the impregnated yarn is squeezed out and introduced into a diazo bath (neutralized in the customary manner), containing 2.6 grams per liter of 4-benzoylamido-5-methyl-2-methoxy-1-aniline. The dyed yarn is then rinsed and soaped in a boiling soap bath. A clear violet dyeing of very satisfactory fastness properties is obtained. The dyestuff has the following formula:

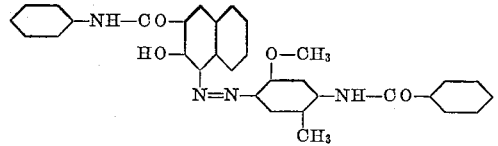

Since an object of the present invention is to provide dyestuffs of good fastness properties, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are the sulfonic acid, the carboxylic acid and the hydroxy group.

We claim:

1. As new products the azo dyestuffs of the general formula:

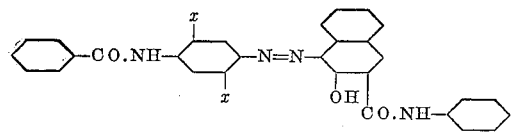

wherein one $x$ stands for an alkoxy group and the other $x$ stands for an alkyl or an alkoxy group, being insoluble in water and aqueous alkali solutions, soluble in concentrated sulfuric acid, and yielding when produced on the fiber blue to violet shades of good fastness to washing, chlorine and kier boiling.

2. As a new product the azo dyestuffs of the formula:

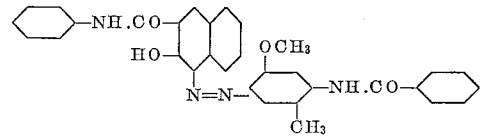

being in its dry pulverized form a dark powder, insoluble in water, soluble in concentrated sulfuric acid and yielding when produced on the fiber cotton clear violet shades of good fastness to washing, chlorine and kier boiling.

3. Fiber dyed with a dyestuff as claimed in claim 1.

4. Fiber dyed with a dyestuff as claimed in claim 2.

5. As new products the azo dyestuffs of the general formula:

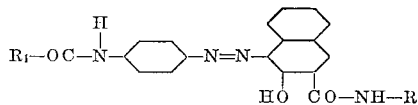

wherein R and $R_1$ stand for radicals of the benzene or naphthalene series, and wherein the nuclei may be substituted by alkyl, alkoxy or halogen, said dyestuffs being insoluble in water and alkali solutions, soluble in concentrated sulphuric acid and yielding when produced on the fiber blue to violet shades of good fastness to washing, chlorine and kier boiling.

6. As new products the azo dyestuffs of the general formula:

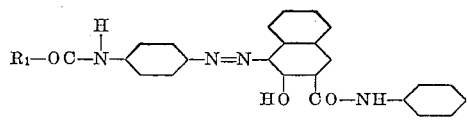

wherein $R_1$ stands for a radical of the benzene or naphthalene series and wherein the nuclei may be substituted by alkyl, alkoxy or halogen, said dyestuffs being insoluble in water and alkali solutions, soluble in concentrated sulfuric acid, and yielding when produced on the fiber blue to violet shades of good fastness to washing, chlorine and kier boiling.

7. Fiber dyed with a dyestuff as claimed in claim 5.

8. Fiber dyed with a dyestuff as claimed in claim 6.

9. As a new product the azo dyestuff of the formula:

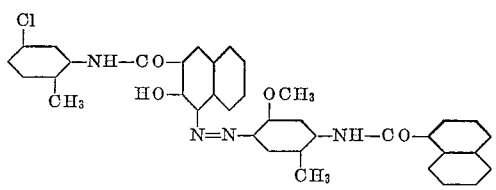

being in its dry pulverized form a dark powder, insoluble in water and yielding when produced on the fiber bluish violet shades of good fastness properties.

10. As a new product the azo dyestuff of the formula:

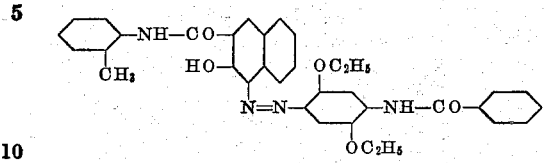

being in its dry pulverized form a dark powder, insoluble in water and yielding when produced on the fiber clear blue shades of good fastness to washing, chlorine and kier boiling.

11. Fiber dyed with the dyestuff as claimed in claim 9.

12. Fiber dyed with the dyestuff as claimed in claim 10.

In testimony whereof we have hereunto set our hands.

EUGEN GLIETENBERG. [L. S.]
WILHELM NEELMEIER. [L. S.]
EUGEN RIMELE. [L. S.]